United States Patent
Randolph et al.

(10) Patent No.: US 12,505,217 B2
(45) Date of Patent: Dec. 23, 2025

(54) SNAPSHOT SCORING FOR INTELLIGENT RECOVERY

(71) Applicant: Dell Products L.P., Round Rock, TX (US)

(72) Inventors: Benjamin A. Randolph, Uxbridge, MA (US); Jeremy O'Hare, Westborough, MA (US)

(73) Assignee: Dell Products L.P., Round Rock, TX (US)

( * ) Notice: Subject to any disclaimer, the term of this patent is extended or adjusted under 35 U.S.C. 154(b) by 85 days.

(21) Appl. No.: 18/419,634

(22) Filed: Jan. 23, 2024

(65) Prior Publication Data

US 2025/0238513 A1 Jul. 24, 2025

(51) Int. Cl.
*G06F 21/56* (2013.01)
*G06F 21/78* (2013.01)

(52) U.S. Cl.
CPC ............ *G06F 21/568* (2013.01); *G06F 21/78* (2013.01); *G06F 2221/034* (2013.01)

(58) Field of Classification Search
CPC ... G06F 21/568; G06F 21/78; G06F 2221/034
See application file for complete search history.

(56) References Cited

U.S. PATENT DOCUMENTS

| | | | |
|---|---|---|---|
| 11,113,152 B1 * | 9/2021 | Jha ..................... | G06F 11/1451 |
| 2023/0147026 A1 * | 5/2023 | Munshani ........... | G06F 11/1435 714/15 |
| 2024/0111633 A1 * | 4/2024 | Yadav ................. | G06F 11/1461 |
| 2025/0103441 A1 * | 3/2025 | Dickens ................. | H04L 63/20 |

* cited by examiner

*Primary Examiner* — Theodore C Parsons
(74) *Attorney, Agent, or Firm* — Daly, Crowley, Mofford & Durkee, LLP

(57) ABSTRACT

A method for restoring a data volume, comprising: receiving a request to restore the data volume; identifying a risk map that is associated with the data volume, the risk map including a plurality of entries, each entry mapping a different respective one of a plurality of snapshot identifiers to a respective risk assessment score for a snapshot corresponding to the snapshot identifier, the respective risk assessment score being generated by security software, the respective risk assessment score representing a level of threat or potential harm posed by one or more files in the data volume; identifying a risk policy that corresponds to the data volume; retrieving the risk assessment score threshold from the risk policy; performing a search of the risk map to identify a snapshot whose respective risk assessment score satisfies the risk assessment score threshold; and using the identified snapshot to restore the data volume.

20 Claims, 5 Drawing Sheets

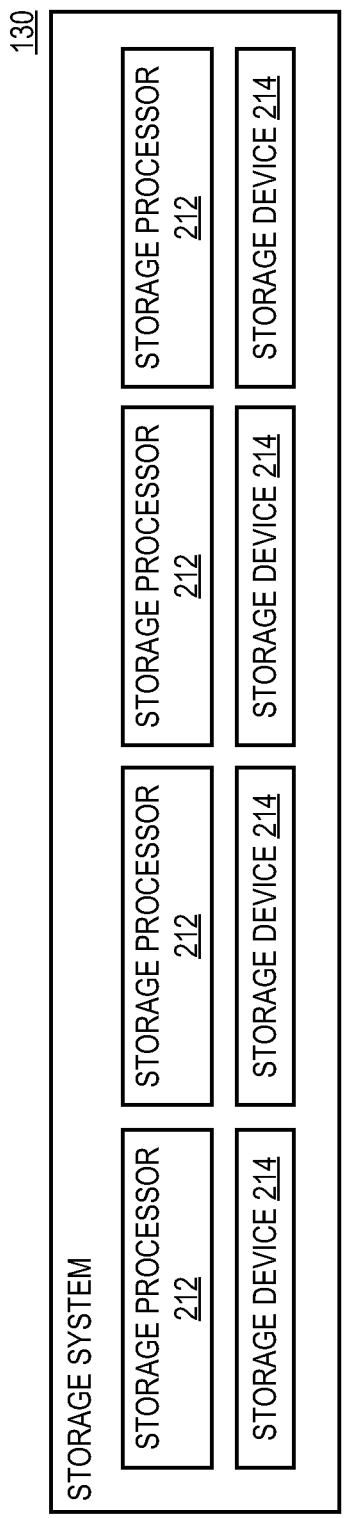

SNAPSHOT SCORING FOR INTELLIGENT RECOVERY

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method for restoring a data volume, comprising: receiving a request to restore the data volume, the data volume being stored on one or more storage devices that are part of a storage system; identifying a risk map that is associated with the data volume, the risk map including a plurality of entries, each entry mapping a different respective one of a plurality of snapshot identifiers to a respective risk assessment score for a snapshot corresponding to the snapshot identifier, the respective risk assessment score being generated by security software that is executed on a host device, the respective risk assessment score representing a level of threat or potential harm posed by one or more files in the data volume; identifying a risk policy that corresponds to the data volume, the risk policy specifying a risk assessment score threshold that must be met by a snapshot in order for the snapshot to be used to restore the data volume; retrieving the risk assessment score threshold from the risk policy; performing a search of the risk map to identify a snapshot whose respective risk assessment score satisfies the risk assessment score threshold; and using the identified snapshot to restore the data volume.

According to aspects of the disclosure, a computing device is disclosed, comprising: a memory; and processing circuitry that is operatively coupled to the memory, the processing circuitry being configured to perform the operations of: receiving a request to restore a data volume, the data volume being stored on one or more storage devices that are part of a storage system; identifying a risk map that is associated with the data volume, the risk map including a plurality of entries, each entry mapping a different respective one of a plurality of snapshot identifiers to a respective risk assessment score for a snapshot corresponding to the snapshot identifier, the respective risk assessment score being generated by security software that is executed on a host device, the respective risk assessment score representing a level of threat or potential harm posed by one or more files in the data volume; identifying a risk policy that corresponds to the data volume, the risk policy specifying a risk assessment score threshold that must be met by a snapshot in order for the snapshot to be used to restore the data volume; retrieving the risk assessment score threshold from the risk policy; performing a search of the risk map to identify a snapshot whose respective risk assessment score satisfies the risk assessment score threshold; and using the identified snapshot to restore the data volume.

According to aspects of the disclosure, a non-transitory computer-readable medium is provided storing one or more processor-executable instructions, which, when executed by a processing circuitry, cause the processing circuitry to perform a process including the operations of: receiving a request to restore a data volume, the data volume being stored on one or more storage devices that are part of a storage system; identifying a risk map that is associated with the data volume, the risk map including a plurality of entries, each entry mapping a different respective one of a plurality of snapshot identifiers to a respective risk assessment score for a snapshot corresponding to the snapshot identifier, the respective risk assessment score being generated by security software that is executed on a host device, the respective risk assessment score representing a level of threat or potential harm posed by one or more files in the data volume; identifying a risk policy that corresponds to the data volume, the risk policy specifying a risk assessment score threshold that must be met by a snapshot in order for the snapshot to be used to restore the data volume; retrieving the risk assessment score threshold from the risk policy; performing a search of the risk map to identify a snapshot whose respective risk assessment score satisfies the risk assessment score threshold; and using the identified snapshot to restore the data volume.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

FIG. 2 is a diagram of an example of a storage system, according to aspects of the disclosure;

FIG. 3 is a diagram of an example of a risk map, according to aspects of the disclosure;

DETAILED DESCRIPTION

Figure 1:
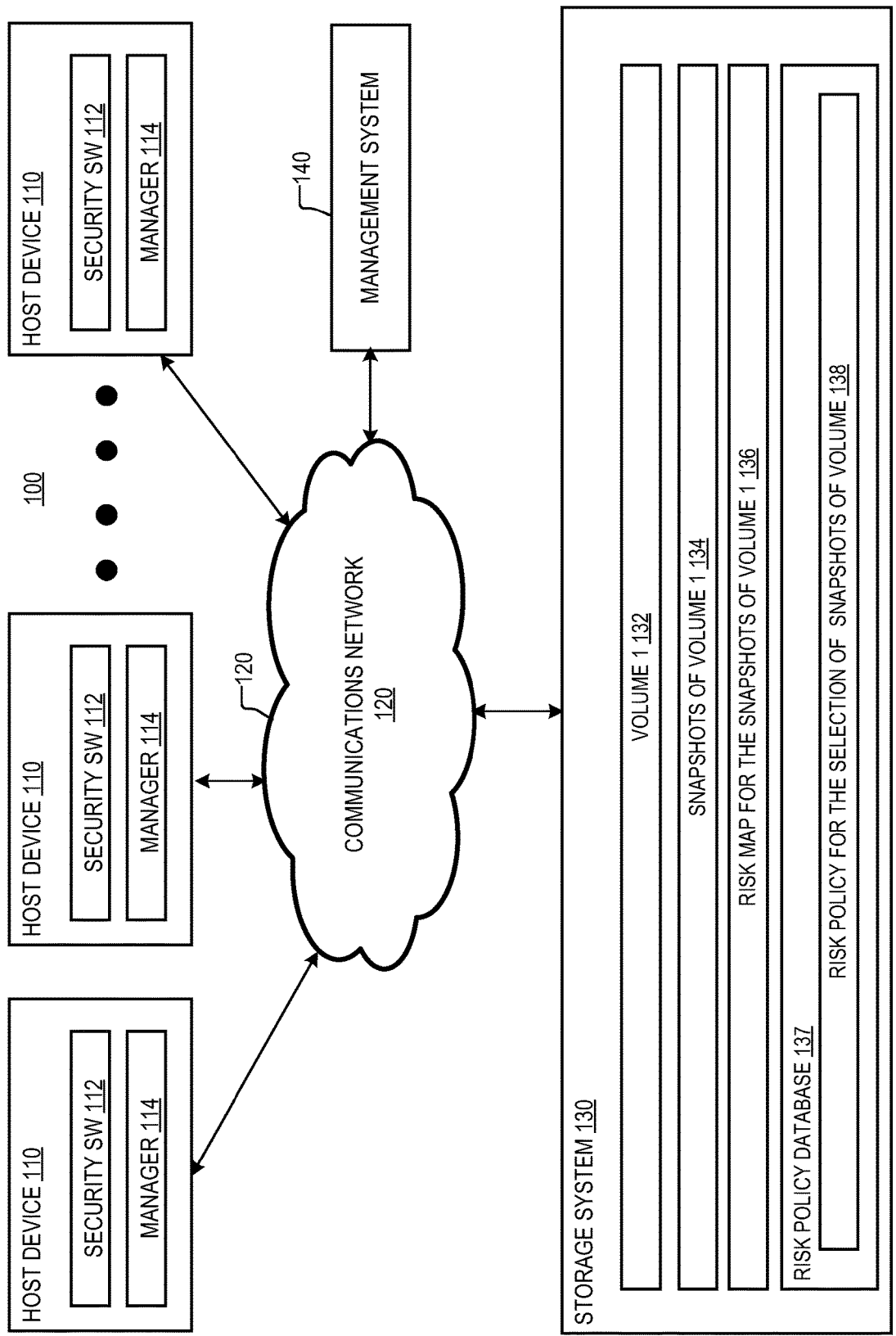
FIG. 1 is a diagram of an example of a system, according to aspects of the disclosure.

FIG. 1 is a diagram of an example of a system 100, according to aspects of the disclosure. As illustrated, system 100 may include a plurality of host devices 110 that are coupled via a communications network 120 to a storage system 130 and a management system 140. Each of the host devices 110 may include one or more of a desktop computer, a smartphone, a laptop, and/or any other suitable type of computing device. For example, in some implementations, any of the host devices 110 may be the same or similar to the computing device 600, which is discussed further below with respect to FIG. 6. The communications network 120 may include one or more of a local area network (LAN), a wide area network (WAN), a wireless network, a cellular network, a 5G network, the Internet, an InfiniBand network, and/or any other suitable type of network. Storage system 130 may include any suitable type of storage system, such as a location-addressable storage system or a content-addressable storage system, for example. The management system 140 may include any suitable type of computing device, such as the computing device 600, which is discussed further below with respect to FIG. 6. Although, in the example of FIG. 1, management system 140 is depicted as being independent of storage system 130, in some implementations, management system 140 may be integrated with storage system 130.

Storage system 130 may include any suitable type of storage system. By way of example, storage system 130 may be a content addressable or a location-addressable storage system. Storage system 130 may be configured to implement, at least in part, a data volume 132. Although in the example of FIG. 1, storage system 130 is depicted as implementing a single data volume (i.e., the data volume 132), in most practical applications, storage system 130 may implement, at least in part, a plurality of data volumes. As can be readily apricated, each of the data volumes that are implemented, at least in part, by storage system 130 may include a logical unit of storage that is allocated to store files, applications, databases, and/or any other type of data. According to the present example, data volume 132 is mounted at each of the host devices 110.

Storage system 130 may provide the ability to create snapshots 134 of data volume 132. According to the present example, the snapshots 134 of data volume are stored in storage system 130 (i.e., on storage devices 214, which are shown in FIG. 2). However, alternative implementations are possible in which any of the snapshots 134 is stored at another storage location. According to the present example, each of snapshots 134 captures the state of volume 132 at a different point-in-time. The creation of snapshots 134 may be driven by management system 140, which may implement a data protection mechanism for volume 132. Specifically, management system 140 may implement one or more policies for the generation of snapshots of volume 132 and execute these policies. For example, management system 140 may implement a policy that specifies that a snapshot of volume 132 should be created every 12 hours. In this example, management system 140 may generate, every 12 hours, an event that causes one or more storage processors 212 (shown in FIG. 2) to create a new snapshot 134 of volume 132. Although, in the example of FIG. 1, storage system 130 is depicted as storing snapshots for volume 132 only, it will be understood that in some implementations, storage system 130 may store a different respective set of snapshots for each of the data volumes that are hosted by storage system 130.

Storage system 130 may store a risk map 136. Risk map 136 may identify a respective risk assessment score (or risk score) for each of the plurality of snapshots 134. As is discussed further below, the respective risk assessment score of each of the snapshots 134 may be generated by the instance of security software 112 that is running on one of the host devices 110. A risk assessment score that is generated by scanning a volume (or a snapshot) may represent the level of threat or potential harm (to data stored on the volume or hardware) that is posed by one or more files in the data volume.

Risk map 136 may be updated to include the risk assessment scores of the snapshots 134 by management system 140. However, alternative implementations are possible in which the risk map 136 is updated by one or more of storage processors 212 (shown in FIG. 2). As used herein, the term "risk map" refers to a memory that identifies a different respective risk assessment score for each of the plurality of snapshots 134. The memory may be contiguous or non-contiguous. In some implementations, risk map 136 may implemented as a database or database table. Additionally or alternatively, in some implementations, risk map 136 may be implemented as a portion of a database or database table. As used herein, the term "database" refers to one or more data structures that are used to store information. The present disclosure is not limited to any specific implementation of risk map 136.

Storage system 130 may store a risk policy database 137. Risk policy database 137 may store a different respective risk policy for each of the plurality of data volumes that are hosted on storage system 130 (not shown). Specifically, the risk policy database 137 may store a risk policy 138. Risk policy 138 may include any suitable type of number, string, or alphanumerical string that specifies the maximum risk assessment score a snapshot 134 can have and still be used in restoring the volume 132. Under risk policy 138, if a snapshot has a risk assessment score that is above the maximum value prescribed by risk policy 138, that snapshot cannot be used to restore volume 132. On the other hand, if a snapshot has a risk assessment score that is below the maximum value prescribed by risk policy 138, that snapshot is permitted to be used to restore volume 132.

Management system 140 may be configured to perform various tasks related to the management of storage system 130, including the allocation of storage space to applications and users, data organization and classification, data protection and backup, performance monitoring and optimization, capacity planning, and security and access control. Moreover, management system 140 may be configured to perform various tasks related to the orchestration of the snapshot process, such as snapshot scheduling, setting rules for how many snapshots to keep at any given time, keeping track of snapshot creation, deletion, and storage uses, as well as enabling automated processes for snapshot creation and management.

Each of host devices 110 may be configured to execute a different instance of security software 112. According to the present example, security software 112 is an anti-virus software application, however alternative implementations are possible in which security software 112 is an intrusion detection software, network traffic monitory software, and/or any other suitable type of software that is configured to detect cyberthreats to the device it is running on. Security software 112 may be configured to scan any of snapshots 134 and generate a risk assessment score for the snapshot. A risk assessment score may be a numerical value (or an alphanumerical value or a string) that is assigned to a snapshot (e.g., a snapshot of a volume) or a volume that indicates the presence of potential threats in the snapshot and/or the degrees to which these treats are dangerous. In one implementation, the value of a risk assessment score may range between 0 and 100, where '0' means that there are no issues with any of the files in the volumes, and "100" means that a virus is detected in at least one of the files in a volume (e.g., volume 132). Risk assessment scores are customarily generated by various antivirus programs that are available on the market, such as Canna™. A risk assessment score for a snapshot or volume may be generated by scanning files stored in the snapshots and checking for known malware signatures, patterns indicative of malicious behavior, and potential risk factors. If files within the snapshot and/or volume match known malware signatures or characteristics, the risk assessment score is increased, which helps identify and mitigate threats or malicious activities. In addition, heuristic analysis may be employed in the calculation of a risk assessment score for a snapshot or volume, such that factors exhibiting heuristic indicators contribute to an elevated risk assessment score. For example, some types of malware that simply steal CPU cycles or display unwanted advertisements may result in a smaller increase to the risk assessment score than malware that could cause the loss of data or hardware damage. As noted above, many antivirus programs that are available on the market have the capability to generate risk assessment scores, and the present disclosure is not limited to any specific method for calculating risk assessment scores.

Each of host devices 110 may be provided with an instance of manager 114. In each host device 110, manager 114 may be configured to serve as an interface between the security software 112 that is executing on this host device and the management system 140. In one example, manager 114 may be configured to receive, from management system 140, an indication that a snapshot of volume 132 has been created. Upon receiving the indication, manager 114 may cause security software 112 to scan volume 132 and generate a risk assessment score for volume 132. According to the present example, manager 114 may cause security software 112 to perform a scan of the volume immediately after the snapshot is created (e.g., within 5 minutes of the creation of the snapshot or before the creation of the next snapshot, etc.), after which the risk assessment score that is generated as a result of the scan is mapped (by risk map 136) to an identifier of the snapshot, and used as the risk assessment score for the snapshot. For example, manager 114 may provide the risk assessment score to management system 140, and upon receiving the risk assessment score, management system 140 may generate a new entry in risk map 136 which maps the risk assessment score to an identifier of the snapshot for which the risk assessment score was created.

In an alternative implementation, manager 114 may fetch the snapshot, store it in a local memory of the host device, and issue a command to security software 112 to perform a scan of the snapshot copy. Upon completing the scan, security software 112 may generate a risk assessment score for the snapshot and provide the risk assessment score to manager 114. Afterwards, manager 114 may provide the risk assessment score to management system 140. Upon receiving the risk assessment score, management system 140 may generate a new entry in risk map 136 which maps the risk assessment score to an identifier of the snapshot for which the risk assessment score was created.

Figure 6:
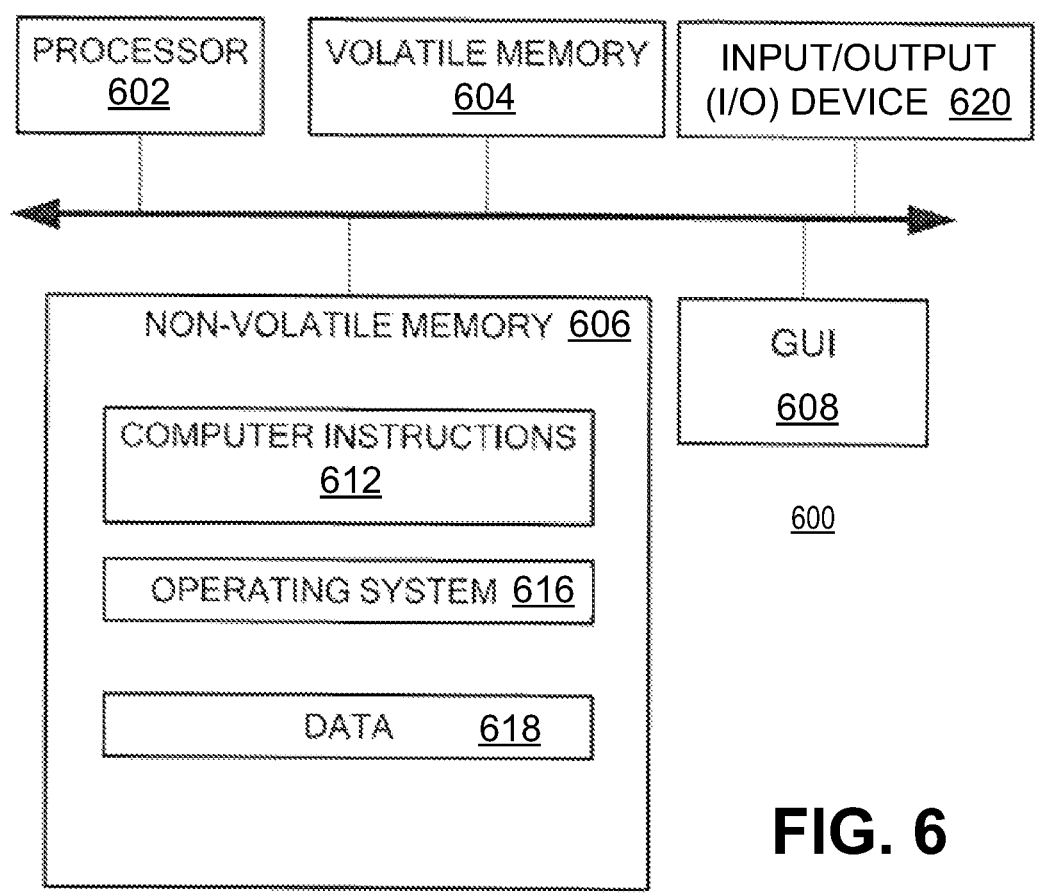
FIG. 6 is a diagram of an example of a computing device, according to aspects of the disclosure.

FIG. 2 shows an example of storage system 130 in further detail, according to aspects of the disclosure. As illustrated, storage system 130 may include a plurality of storage processors 212 and a plurality of storage devices 214. Each of the storage processors 212 may include a computing device that is configured to receive I/O requests (e.g., read or write requests, etc.) from any of the host devices 110 and execute the received I/O requests by reading or writing data to the storage devices 214. In some implementations, each of the storage processors 212 may have an architecture that is the same or similar to the architecture of the computing device 600, which is shown in FIG. 6. Each of the storage devices 214 may include any of a solid-state drive (SSD), a non-volatile random-access memory (nvRAM) device, a non-volatile memory express (NVME) device, a hard disk (HD), and/or any other suitable type of storage device. In some implementations, the storage devices 214 may be arranged in one or more Redundant Array(s) of Independent Disks (RAID) arrays. In some implementations, the data that comprises data volume 132 may be stored in the RAID array.

FIG. 3 is a diagram of an example of risk map 136, according to aspects of the disclosure. As illustrated, risk map 136 may include a plurality of entries 302. Each entry 302 may include a respective snapshot identifier and a respective risk assessment score. The respective risk assessment score in each entry 302 may be generated by the security software 112 (in one of host devices 110) as a result of scanning the snapshot that is identified by the snapshot identifier which is part of the same entry 302 (or as a result of scanning the volume corresponding to the identified snapshot immediately after the snapshot is created). Although risk map 136 is depicted as a table, it will be understood that the present disclosure is not limited to any specific implementation of risk map 136. For example, risk map 136 may be implemented as a search tree, and/or any other suitable type of data structure. According to the example of FIGS. 1-3, risk map 136 is stored on one or more of storage devices 214. However, alternative implementations are possible in which risk map 136 is stored in the memory of management system 140. Stated succinctly, the present disclosure is not limited to storing the risk map 136 at any particular storage location.

Figure 4:
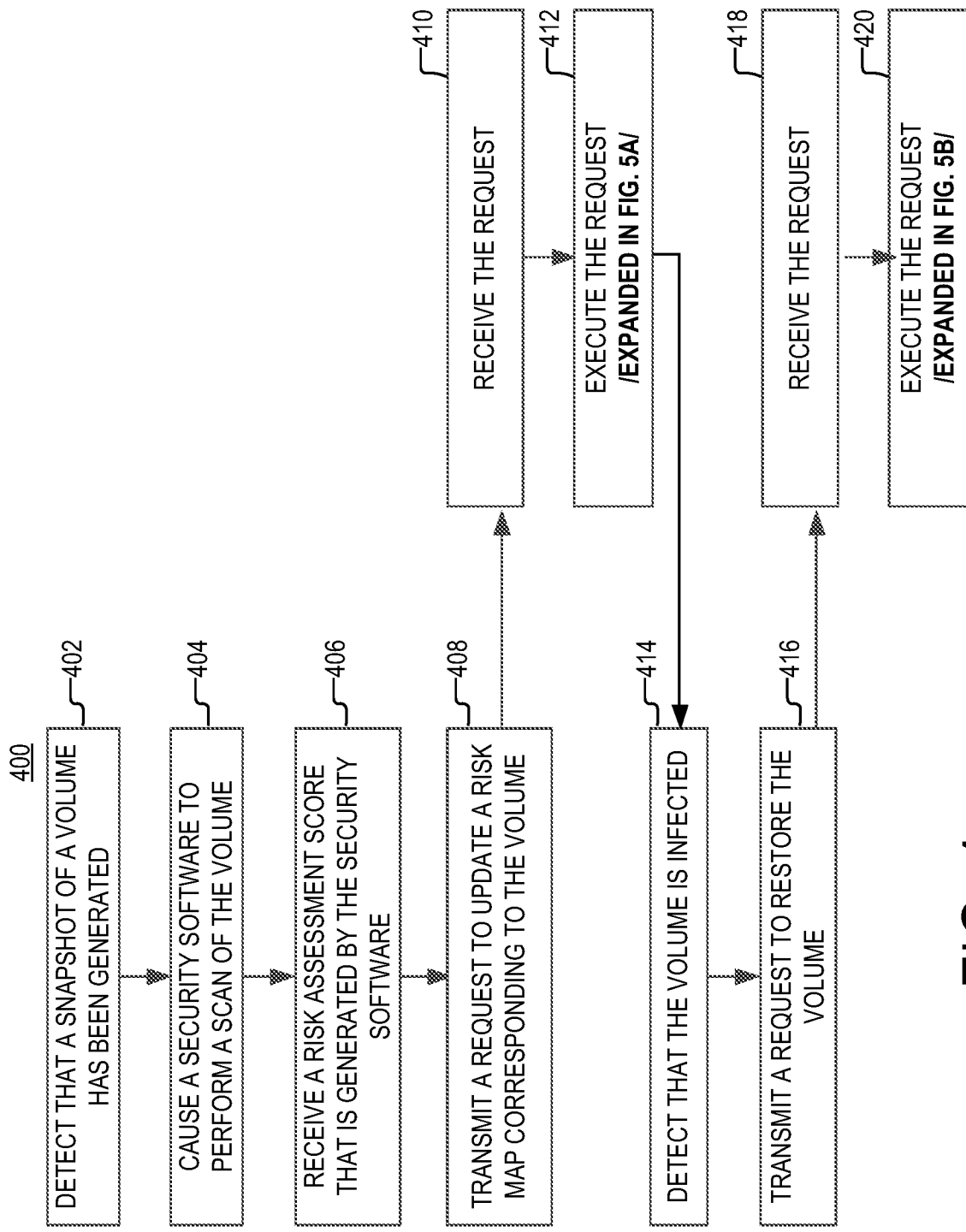
FIG. 4 is a flowchart of an example of a process, according to aspects of the disclosure.

FIG. 4 is a flowchart of an example of a process 400, according to aspects of the disclosure. According to the example of FIG. 4, process 400 is executed by the manager 114 that is running on one of the host devices 110 and the management system 140. However, the present disclosure is not limited to any specific entity or set of entities executing the process 400.

At step 402, manager 114 detects that a snapshot of volume 132 has been created. In some implementations, detecting that the snapshot has been created may include receiving a message, from management system 140 (or one of storage processors 212). At step 404, manager 114 causes the instance of security software 112 that is installed on the same host device as manager 114 to perform a scan of the volume. In some implementations, manager 114 may call a particular API that is provided by security software 112, which causes security software 112 to perform a scan of the volume and generate a risk assessment score for the volume as a result of the scan. As noted above, the risk assessment score may be regarded as corresponding to the snapshot of the volume because it is generated shortly after the snapshot. At step 406, manager 114 receives the risk assessment score that is generated by the security software 112.

At step 408, manager 114 transmits, to management system 140, a request to update a risk map that is associated with volume 132. The risk map associated with the snapshot may be any risk map that contains the risk assessment scores for different snapshots of volume 132. According to the present example, the risk map associated with the snapshot is risk map 136, which is discussed above with respect to FIG. 3. The request to update the risk map may include an identifier of the snapshot for which the risk assessment score is generated (i.e., the snapshot detected at step 402), the risk assessment score, and optionally an identifier of the volume of which the snapshot is an image of (i.e., volume 132).

Figure 5:
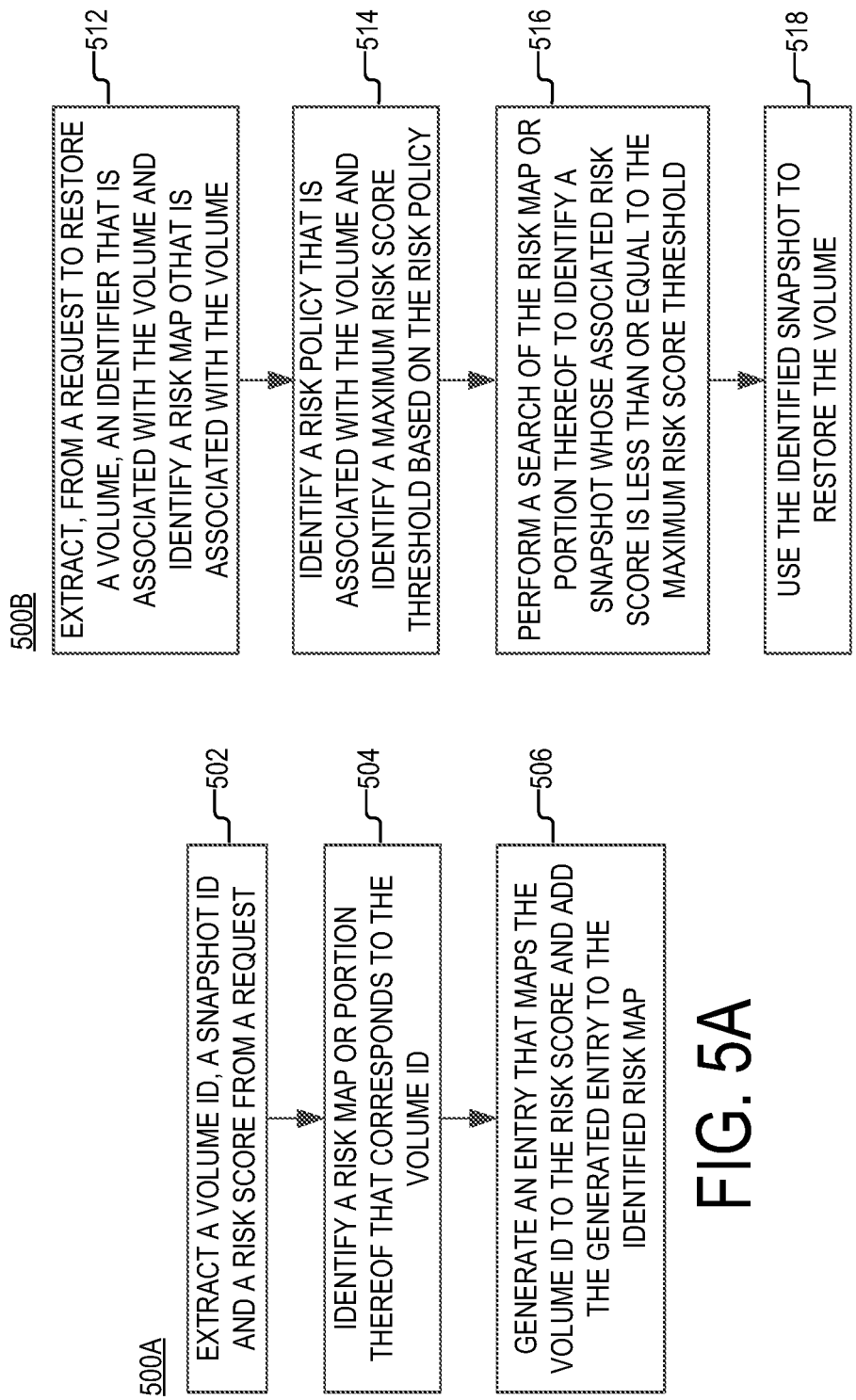
FIG. 5A is a flowchart of an example of a process, according to aspects of the disclosure.
FIG. 5B is a flowchart of an example of a process, according to aspects of the disclosure.

At step 410, management system 140 receives the request to update the risk map. At step 412, management system 140 executes the request to update the risk map. In some implementations, the request may be executed in accordance with a process 500A, which is discussed further below with respect to FIG. 5A. At step 414 manager 114 detects that volume 132 is infected with malware. In some implementations, security software 112 may perform a scan of volume 132, detect the malware, and notify manager 114 that volume 132 is infected (e.g., by calling a particular API that is provided by manager 114). At step 416, manager 114 transmits, to management system 140, a request to restore the volume from an earlier snapshot of the volume. In some implementations, the request may be transmitted over communications network 120. In some implementations, the request may include an identifier of the infected volume. At step 418, management system 140 receives the request to restore the volume. At step 420, management system 140 executes the request to restore the volume. In some implementations, the request may be executed in accordance with a process 500B, which is discussed further below with respect to FIG. 5B.

In some implementations, manager 114 may prepare for a device scan by taking a snapshot of volume 132. Specifically, manager 114 may transmit an instruction to management system 140, which when executed by management system 140, would cause the management system 140 to take a snapshot of volume 132. In some implementations, management system 140 may execute the instruction by transmitting another instruction to any of storage processors 212 of storage system 130, which would cause the storage processor to generate a snapshot of volume 132. After receiving an acknowledgment that the snapshot is generated, management system 140 may notify manager 114 that the snapshot has been generated. In response to detecting that the snapshot is generated, manager 114 may cause the instance of security software 112, which is executed on the same host device 110 as manager 114, to perform a scan of volume 132 (at step 404). As noted above, as a result of scanning the volume, security software 112 may generate a risk score for volume 132, which is subsequently mapped (at steps 408-412) to the snapshot of volume 132 that was generated immediately before the scan of volume 132 (which resulted in the risk score being generated), and whose generation triggered the scan of the volume (at step 404).

In some implementations, after a scan of volume 132 is performed at step 414, and the security software 112 has detected that volume 132 is infected with malware, security software 112 may decide on the action that is needed to mitigate infection. The action may include one of quarantining the volume 132, deleting one or more infected files from volume 132, restoring an operating system that is installed on volume 132, and/or any other suitable action. In some implementations, security software 112 may cause manager 114 to restore volume 132 from one of snapshots 134 (i.e., roll back the volume 132) only if the mitigation action selected by security software is not successful. In some implementations, security software 112 may display a prompt for the user to restore volume 132 from one of snapshots 134. The prompt may give the user the option to proceed with the volume restore or cancel the action. In some implementations, steps 416-420 may be executed only when the user selects the option to proceed with the volume restore. The selection may be performed by the user clicking a button (or activating another input component) that is provided as part of the prompt. Although in the example of FIG. 1, security software 112 and manager 114 are depicted as separate entities, in some implementations they may be integrated with each other. Each instance of manager 114 and/or software 112 may be implemented in software, hardware, or as a combination of software and hardware.

FIG. 5A is a flowchart of an example of a process 500A for updating a risk map, as specified by step 412 of process 400. According to the present example, process 500A is performed by management system 140. As discussed above with respect to FIG. 4, process 400 may be performed in response to management system 140 receiving the request to update the risk map (at step 410).

At step 502, the management system 140 extracts a volume ID, a snapshot ID, and a risk assessment score from the request. According to the present example, the extracted volume ID belongs to volume 132 (shown in FIG. 1), the snapshot ID corresponds to the snapshot whose creation is detected at step 402, and the risk assessment score is the one calculated at step 404.

At step 504, the management system 140 identifies a risk map that is associated with the volume ID. According to the present example, the identified risk map is risk map 136. In some implementations, storage system 130 may store a plurality of risk mapS, wherein each risk map is associated with a different data volume that is hosted on storage system 130. Each risk map may contain an identifier of the volume it is associated with (as part of the risk map's metadata). In this regard, identifying the risk map may include performing a search of a plurality of risk maps that are available in storage system 130 and identifying the risk map that is associated with the volume ID that is received (at step 502) as part of the request. As can be readily appreciated, the search may be performed by using the volume ID as a search key.

At step 506, the management system 140 that maps the snapshot ID (extracted at step 502) to the risk assessment score (extracted at step 502), and stores the generated entry in the risk map (identified at step 504). In some implementations, the generated entry may be the same or similar to any of the entries 302, which are discussed above with respect to FIG. 3.

FIG. 5B is a flowchart of an example of a process 500A for restoring a volume, as specified by step 420 of process 400. As discussed above with respect to FIG. 4, process 400 may be performed in response to management system 140 receiving the request to restore the volume (at step 418).

At step 512, management system 140 extracts a volume ID from the received request, after which management system 140 identifies a risk map that is associated with the volume. The risk map may be identified in the manner discussed above with respect to step 504 of process 500A. According to the example of FIG. 5B, the extracted volume ID belongs to volume 132 and the identified risk map is risk map 136 (shown in FIG. 3)

At step 514, management system 140, identifies a risk policy that is associated with the volume ID. According to the present example, policy 138 (shown in FIG. 1) is identified. In some implementations, storage system 130 may store a plurality of risk policies (not shown). Each risk policy may be associated with a different one of a plurality of data volumes that are hosted in storage system 130, and may specify a maximum risk assessment score a snapshot of the volume can have and still be used to restore the volume. In some implementations, the plurality of risk policies may be stored in a database, such as database 137, and keyed to identifiers corresponding to the data volumes. In such implementations, step 514 may be executed by performing a search of the database (based on the volume ID that is extracted at step 512) and retrieving the risk policy that corresponds to the volume ID. After the risk policy is identified, management system 140 may identify the maximum risk assessment threshold that is associated with the snapshot.

At step 516, management system 140 performs a search of the risk map to find the most recent snapshot of the volume (identified at step 512), which has a risk assessment score that is less than or equal to the maximum risk assessment score that is prescribed by the risk policy (identified at step 514). As a result of the search, management system 140 retrieves an identifier of the snapshot.

At step 518, management system 140 restores the volume (identified at step 512) based on the snapshot (identified at step 516). As can be readily appreciated, restoring the volume may include reverting the volume to the state that is captured in the snapshot. As noted above, the restoration of the volume to the state captured by the snapshot is triggered by detecting that the volume is infected with a virus or other malware. Furthermore, as noted above, the snapshot is selected based on a policy that specifies a maximum risk assessment score a snapshot must have and still be used to restore the volume. As can be readily appreciated using the policy is advantageous because it enables the roll-back of the volume to a state that is expected (or ideally guaranteed) to precede the infection of the volume.

In some implementations, storage system 130 may have its own malware detection capabilities. Specifically, any of storage processors 212 (and/or management system 140) may execute a respective instance of security software (not shown). The security software that is executed on storage processors 212 (and/or management system 140) may be different from security software 112. The security software that is executed on storage processors 212 (and/or management system 140) may be configured to scan any of snapshots 134 and come up with its own estimate of whether the snapshot is infected. In this regard, in some implementations, when a snapshot is selected at step 516, one of the storage processors 212 (or management system 140) may scan the selected snapshot by using its own malware detection capabilities. If the scan results in a determination that the snapshot is infected (or at high risk of being infected), the selected snapshot may be discarded and step 516 may be repeated. The repetition of step 516 may result in the selection of the next most recent snapshot whose respective risk score is less than the maximum specified by the risk policy (identified at step 514).

In some implementations, the scan of a snapshot volume with the security software that is running on a storage processor 212 (and/or management system 140) may result in a second risk score being generated for the snapshot. The second risk score may be different from the risk score that is mapped to the identifier of the snapshot by risk map 136. The snapshot may be considered to be at high risk of being infected with malware, if the second risk score is above a predetermined threshold.

In one example, host-based malware/intrusion detection software (such as security software 112, which is shown in FIG. 1) may not be aware of the storage behind the filesystem of volume 132. Furthermore, any malware detection that is deployed on storage system 130 may lack access to threat definitions and file access heuristics that are available to the host-based malware/intrusion detection software. After infection, the host-based backup/recovery options of any of host devices 110 may be hampered by the infection. In this regard, the orchestration between host/file based security software (such as security software 112) and security software that is deployed on a storage system (such as storage system 130) can drastically improve impact prevention and recovery effectiveness.

Although, in the example of FIG. 5B, process 500B is performed by management system 140. Alternative implementations are possible in which process 500B is performed by one of storage processors 212 (shown in FIG. 2) and/or any other node in storage system 130. In such implementations, the request to restore the volume (transmitted at step 416) may be sent directly to the storage processor 212 or another node. Alternatively, the request may be transmitted to management system 140, after which management system 140 may forward the request to the storage processor 212 (or another node).

In many practical applications, management system 140 may be tasked with the management of risk map 136, while the restoration of volume 132 (from snapshots) is delegated to other components of storage system 130, such as the storage processors 212, hypervisors that are running on the storage processor 212, and/or host operating systems that are executing on the hypervisor. Stated succinctly, the present disclosure is not limited to any specific implementation of the process(es) that is/are discussed above with respect to FIGS. 4, 5A, and 5B.

In some implementations, all snapshots that are identified in a risk map may have risk assessment scores that are higher than the maximum prescribed by a risk policy. In such implementations, a snapshot that has the highest risk assessment score may be selected, despite that the risk assessment score is above the maximum prescribed by the risk policy.

As noted above, in some implementations, management system 140 may implement a retention policy for snapshots 134. The retention policy may be at least in part based on the respective risk scores of snapshots 134, which are stored in risk map 136. The retention policy may provide that snapshots with high risk assessment scores (i.e., risk scores that are indicative of a high likelihood of infection or severity of infection) are to be deleted first. For example, the retention policy may provide that snapshots that have risk assessment scores above a predetermined threshold are to be deleted first. When no more snapshots remain whose risk scores are above the threshold, the retention policy may provide that the oldest snapshots are to be deleted first. Furthermore, the retention policy may specify the maximum (and/or minimum) number of snapshots of volume 132 which are to be kept in storage at any given time. For example, the retention policy may provide that at least 20 snapshots of volume 132 should be stored in storage system 130 before some of the snapshots of volume 132 can begin to be deleted.

Referring to FIG. 6, in some embodiments, a device 600 may include processor 602, volatile memory 604 (e.g., RAM), non-volatile memory 606 (e.g., a hard disk drive, a solid-state drive such as a flash drive, a hybrid magnetic and solid-state drive, etc.), graphical user interface (GUI) 608 (e.g., a touchscreen, a display, and so forth) and input/output (I/O) device 620 (e.g., a mouse, a keyboard, etc.). Non-volatile memory 606 stores computer instructions 612, an operating system 616 and data 618 such that, for example, the computer instructions 612 are executed by the processor 602 out of volatile memory 604. Program code may be applied to data entered using an input device of GUI 608 or received from I/O device 620.

FIGS. 1-6 are provided as an example only. In some embodiments, an I/O request may refer to a data read or write request. At least some of the steps discussed with respect to FIGS. 1-6 may be performed in parallel, in a different order, or altogether omitted. As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. The term "processing circuitry" as used throughout the specification may refer to one or more of a general-purpose processor (e.g., an x86 processor, an ARM-based processor, or a RISC-V processor), a field programmable gate array (FPGE), an application-specific integrated circuit (ASIC), and/or any other suitable type of electronic circuitry. The term "malware" may refer to any software designed to exploit a computer system, a computer network, or a user. Examples of malware include viruses, worms, Trojans, ransomware, spyware, adware.

As noted above, a low value of a risk assessment score (e.g., '0') is indicative of a low risk to a volume and a high value of the risk assessment score (e.g., '100') is indicative of a high risk to the volume (e.g. a high risk of the volume being infected with malware or a high risk of the volume being infected with malware that could cause significant damage). Furthermore, as noted above, a risk policy, such as risk policy 138, may specify a risk assessment score threshold. Under the nomenclature of the present disclosure, when the value of risk assessment score is proportional to the degree of risk, the phrase "the risk assessment threshold is met by the risk assessment score of a snapshot" shall mean that the risk assessment score is less than (or less than or equal to) the risk assessment score threshold.

In alternative implementations, a high value of a risk assessment score (e.g., '100') is indicative of a low risk to a volume and a low value of the risk assessment score (e.g., '0') is indicative of a high risk to the volume (e.g. a high risk of the volume being infected with malware or a high risk of the volume being infected with malware that could cause significant damage). Under the nomenclature of the present disclosure, when the value of the risk assessment score is inversely proportional to the degree of risk, the phrase "the risk assessment threshold is met by the risk assessment score of a snapshot" shall mean that the risk assessment score is greater than (or less than or equal to) the risk assessment score threshold.

Although in the example of FIGS. 1-6, risk policy 138 specifies a maximum risk assessment score a snapshot can have and till be used to restore volume 132, when the relationship between the magnitude of the risk score and level of risk is reversed, risk policy 138 may specify a minimum risk assessment score a snapshot can have and still be used to restore volume 132.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method for restoring a data volume, comprising:
receiving a request to restore the data volume, the data volume being stored on one or more storage devices that are part of a storage system;
identifying a risk map that is associated with the data volume, the risk map including a plurality of entries, each entry mapping a different respective one of a plurality of snapshot identifiers to a respective risk assessment score for a snapshot corresponding to the snapshot identifier, the respective risk assessment score being generated by security software that is executed on a host device, the respective risk assessment score representing a level of threat or potential harm posed by one or more files in the data volume, each of the risk assessment scores being within a range defined by a first value and a second value, the first value corresponding to corresponding to a detection of a virus in the risk assessment score's respective snapshot;
identifying a risk policy that corresponds to the data volume, the risk policy specifying a risk assessment score threshold that must be met by a snapshot in order for the snapshot to be used to restore the data volume the risk assessment co threshold specifying a boundary risk assessment score that a snapshot can have and still be used for data volume restoration;
retrieving the risk assessment score threshold from the risk policy;
performing a search of the risk map to identify a snapshot whose respective risk assessment score satisfies the risk assessment score threshold, the respective risk assessment score of the identified snapshot being generated and stored in the risk map prior to receipt of the request to restore the data volume; and
using the identified snapshot to restore the data volume, wherein the risk scores stored in the risk map are used as input for evaluating the risk policy, the risk policy being evaluated as part of executing requests to restore the data volume, the disk policy being evaluated separately for each of the requests to restore the data volume.

2. The method of claim 1, wherein identifying the risk policy includes performing a search of a risk policy database to identify a risk policy that corresponds to the data volume.

3. The method of claim 1, wherein the identified snapshot is a most recent snapshot whose respective risk assessment score satisfies the risk assessment score threshold.

4. The method of claim 1, wherein the security software includes anti-virus software.

5. The method of claim 1, wherein the risk map is populated by a management system that is configured to receive risk assessment scores from host devices where the data volume is mounted and update the risk map with the received risk assessment scores, the management system being further configured to implement a data protection mechanism for generating snapshots of the data volume.

6. The method of claim 5, wherein the risk map is stored in a memory of the management system.

7. The method of claim 1, wherein the plurality of snapshot identifiers corresponds to a plurality of snapshots and the risk management ap is stored in the storage system together with the plurality of snapshots.

8. A computing device, comprising:
a memory; and
processing circuitry that is operatively coupled to the memory, the processing circuitry being configured to perform the operations of:
receiving a request to restore a data volume, the data volume being stared on one or more storage devices that are part of a storage system;
identifying a risk map that is associated with the data volume, the risk map including a plurality of entries, each entry mapping a different respective one of a plurality of snapshot identifiers to a respective risk assessment score for a snapshot corresponding to the snapshot identifier, the respective risk assessment score being generated by security software that is executed on a host device, the respective risk assessment score representing a level of threat or potential harm posed by one or more files in the data volume, each of the risk assessment scores being within a range defined by a first value and a second value, the first value corresponding to absence of any threat in the risk assessment score's respective snapshot, and the second value corresponding to a detection of a virus in the risk assessment score's respective snapshot;
identifying a risk policy that corresponds to the data volume, the risk policy specifying a risk assessment score threshold that must be met by a snapshot in order for the snapshot to be used to restore the data volume, the risk assessment score threshold specifying a boundary risk assessment score that a snapshot can have and still be used for data volume restoration;
retrieving the risk assessment score threshold from the risk policy;
performing a search of the risk map to identify a snapshot whose respective risk assessment score satisfies the risk assessment score threshold the respective risk assessment score of the identified snapshot being generated and stored in the risk map prior to receipt of the request to restore the data volume; and
using the identified snapshot to restore the data volume, wherein the risk scores stored in the risk map are used as input for evaluating the risk policy, the risk policy being evaluated as part of executing requests to restore the data volume, the risk policy being evaluated separately for each of the requests to restore the data volume.

9. The computing device of claim 8, wherein identifying the risk policy includes performing a search of a risk policy database to identify a risk policy that corresponds to the data volume.

10. The computing device of claim 8, wherein the identified snapshot is a most recent snapshot whose respective risk assessment score satisfies the risk assessment score threshold.

11. The computing device of claim 8, wherein the security software includes anti-virus software.

12. The computing device of claim 8, wherein the risk map is populated by a management system that is configured to receive risk assessment scores from host devices where the data volume is mounted and update the risk map with the received risk assessment scores, the management system being further configured to implement a data protection mechanism for generating snapshots of the data volume.

13. The computing device of claim 12, wherein the risk map is stored in a memory of the management system.

14. The computing device of claim 8, wherein the computing device includes a storage processor that is part of the storage system, and the risk map is stored in the memory.

15. A non-transitory computer-readable medium storing one or more processor-executable instructions, which, when executed by a processing circuitry, cause the processing circuitry to perform a process including the operations of:
   receiving a request to restore a data volume, the data volume being stored on one or more storage devices that are part of a storage system;
   identifying a risk map that is associated with the data volume, the risk map including a plurality of entries, each entry mapping a different respective one of a plurality of snapshot identifiers to a respective risk assessment score for a snapshot corresponding to the snapshot identifier, the respective risk assessment score being generated by security software that is executed on a host device, the respective risk assessment score representing a level of threat or potential harm posed by one or more files in the data volume, each of the risk assessment scores being within a range defined by a first value and a second value, the first value corresponding to absence of any threat in the risk assessment score's respective snapshot, and the second value corresponding to a detection of a virus in the risk assessment score's respective snapshot;
   identifying a risk policy that corresponds to the data volume, the risk policy specifying a risk assessment score threshold that must be met by a snapshot in order for the snapshot to be used tor tarre the data volume the risk assessment score threshold specifying a boundary risk assessment score that a snapshot can have and still be used for data volume restoration;
   retrieving the risk assessment score threshold from the risk policy;
   performing a search of the risk map to identify a snapshot whose respective risk assessment score satisfies the risk assessment score threshold, the respective risk assessment score of the identified snapshot being generated and stored in the risk map prior to receipt of the request to restore the data volume; and
   using the identified snapshot to restore the data volume, wherein the risk scores stored in the risk map are used as input for evaluating the risk policy, the risk policy being evaluated as part of executing requests to restore the data volume, the risk policy being evaluated separately for each of the requests to restore the data volume.

16. The non-transitory computer-readable medium of claim 15, wherein identifying the risk policy includes performing a search of a risk policy database to identify a risk policy that corresponds to the data volume.

17. The non-transitory computer-readable medium of claim 15, wherein the identified snapshot is a most recent snapshot whose respective risk assessment score satisfies the risk assessment score threshold.

18. The non-transitory computer-readable medium of claim 15, wherein the security software includes anti-virus software.

19. The non-transitory computer-readable medium of claim 15, wherein the risk map is populated by a management system that is configured to receive risk assessment scores from host devices where the data volume is mounted and update the risk map with the received risk assessment corm, the management system being further configured to implement a data protection mechanism for generating snapshots of the data volume.

20. The non-transitory computer-readable medium of claim 19, wherein the risk map is stared in a memory of the management system.

\* \* \* \* \*